(12) United States Patent
Wang et al.

(10) Patent No.: US 7,483,793 B2
(45) Date of Patent: Jan. 27, 2009

(54) METHOD OF GENERATING A DEEP RESISTIVITY IMAGE IN LWD MEASUREMENTS

(75) Inventors: Tsili Wang, Katy, TX (US); Roland E. Chemali, Kingwood, TX (US)

(73) Assignee: Baker Hughes Incorporated, Houston, TX (US)

(*) Notice: Subject to any disclaimer, the term of this patent is extended or adjusted under 35 U.S.C. 154(b) by 84 days.

(21) Appl. No.: 11/489,875

(22) Filed: Jul. 20, 2006

(65) Prior Publication Data

US 2007/0024285 A1 Feb. 1, 2007

Related U.S. Application Data

(60) Provisional application No. 60/703,037, filed on Jul. 27, 2005.

(51) Int. Cl.
*G01V 1/40* (2006.01)
(52) U.S. Cl. ............................................. 702/7
(58) Field of Classification Search ............... 702/7, 702/11–18; 324/338–343
See application file for complete search history.

(56) References Cited

U.S. PATENT DOCUMENTS

| 5,168,234 | A | * | 12/1992 | Freedman | .................... 324/338 |
| RE35,386 | E | | 12/1996 | Wu et al. | .................... 175/45 |
| 5,899,958 | A | * | 5/1999 | Dowell et al. | .................... 702/6 |
| 6,181,138 | B1 | * | 1/2001 | Hagiwara et al. | .................... 324/338 |
| 6,556,015 | B1 | | 4/2003 | Omeragic et al. | .................... 324/338 |
| 6,957,708 | B2 | | 10/2005 | Chemali et al. | .................... 175/50 |
| 6,969,994 | B2 | | 11/2005 | Minerbo et al. | .................... 324/343 |
| 2003/0085707 | A1 | * | 5/2003 | Minerbo et al. | .................... 324/343 |
| 2003/0229449 | A1 | | 12/2003 | Merchant et al. | |
| 2004/0113626 | A1 | | 6/2004 | Wang et al. | |
| 2004/0155660 | A1 | * | 8/2004 | Omeragic | .................... 324/338 |
| 2005/0140374 | A1 | | 6/2005 | Itskovich | |

FOREIGN PATENT DOCUMENTS

WO  WO 00/50926  8/2000

OTHER PUBLICATIONS

T. Wang et al.; *Methodology of a deep azimuthal LWD resistivity measurement*, pp. 1-4, 10 Figs, no date.
Qiming Li et al.; *New Directional Electromagnetic Tool for Proactive Geosteering and Accurate Formation Evaluation While Drilling*, SPWLA 46th Annual Logging Symposium, Jun. 26-29, 2005, pp. 1-15, 15 Figs.
Lawrence Chou et al.; *Steering Toward Enhanced Production*, Oilfield Review, Autumn 2005, pp. 54-63.

* cited by examiner

*Primary Examiner*—Bryan Bui
*Assistant Examiner*—Aditya S Bhat
(74) *Attorney, Agent, or Firm*—Madan, Mossman & Sriram, P.C.

(57) ABSTRACT

A pseudo-image is produced by combining deep-reading azimuthally sensitive resistivity measurements with azimuthally insensitive resistivity measurements made by a multiple propagation resistivity tool. This image is useful in reservoir navigation. Features on the azimuthally sensitive measurements such as saddle-points and mid-points are diagnostic of bed geometry relative to the borehole.

11 Claims, 17 Drawing Sheets

METHOD OF GENERATING A DEEP RESISTIVITY IMAGE IN LWD MEASUREMENTS

CROSS-REFERENCES TO RELATED APPLICATIONS

This application claims priority from U.S. Provisional Patent Application Ser. No. 60/703,037 filed on 27 Jul. 2005.

BACKGROUND OF THE INVENTION

1. Field of the Invention

This invention relates generally to drilling of deviated wells into earth formations, and more particularly to the maintaining the wells in a desired position relative to an interface within a reservoir.

2. Description of the Related Art

To obtain hydrocarbons such as oil and gas, well boreholes are drilled by rotating a drill bit attached at a drill string end. The drill string may be a jointed rotatable pipe or a coiled tube. Boreholes may be drilled vertically, but directional drilling systems are often used for drilling boreholes deviated from vertical and/or horizontal boreholes to increase the hydrocarbon production. Modern directional drilling systems generally employ a drill string having a bottomhole assembly (BHA) and a drill bit at an end thereof that is rotated by a drill motor (mud motor) and/or the drill string. A number of downhole devices placed in close proximity to the drill bit measure certain downhole operating parameters associated with the drill string. Such devices typically include sensors for measuring downhole temperature and pressure, tool azimuth, tool inclination. Also used are measuring devices such as a resistivity-measuring device to determine the presence of hydrocarbons and water. Additional downhole instruments, known as measurement-while-drilling (MWD) or logging-while-drilling (LWD) tools, are frequently attached to the drill string to determine formation geology and formation fluid conditions during the drilling operations.

Boreholes are usually drilled along predetermined paths and proceed through various formations. A drilling operator typically controls the surface-controlled drilling parameters during drilling operations. These parameters include weight on bit, drilling fluid flow through the drill pipe, drill string rotational speed (r.p.m. of the surface motor coupled to the drill pipe) and the density and viscosity of the drilling fluid. The downhole operating conditions continually change and the operator must react to such changes and adjust the surface-controlled parameters to properly control the drilling operations. For drilling a borehole in a virgin region, the operator typically relies on seismic survey plots, which provide a macro picture of the subsurface formations and a pre-planned borehole path. For drilling multiple boreholes in the same formation, the operator may also have information about the previously drilled boreholes in the same formation.

In development of reservoirs, it is common to drill boreholes at a specified distance from fluid contacts within the reservoir. An example of this is shown in FIG. 2. A resistivity sensor 119 on a bottomhole assembly 121 may be used for making resistivity measurements. A drill-bit indicated by 117 drills the borehole 115. where a porous formation denoted by 105a, 105b has an oil water contact denoted by 113. The porous formation is typically capped by a caprock such as 103 that is impermeable and may further have a non-porous interval denoted by 109 underneath. The oil-water contact is denoted by 113 with oil above the contact and water below the contact: this relative positioning occurs due to the fact the oil has a lower density than water. In reality, there may not be a sharp demarcation defining the oil-water contact; instead, there may be a transition zone with a change from high oil saturation at the top to a high water saturation at the bottom. In other situations, it may be desirable to maintain a desired spacing from a gas-oil. This is depicted by 114 in FIG. 1. It should also be noted that a boundary such as 114 could, in other situations, be a gas-water contact.

In order to maximize the amount of recovered oil from such a borehole, the boreholes are commonly drilled in a substantially horizontal orientation in close proximity to the oil water contact, but still within the oil zone. US Pat. RE35386 to Wu et al, having the same assignee as the present application and the contents of which are fully incorporated herein by reference, teaches a method for detecting and sensing boundaries in a formation during directional drilling so that the drilling operation can be adjusted to maintain the drillstring within a selected stratum is presented. The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well is thereafter drilled wherein resistivity is logged in real time and compared to that of the modeled horizontal resistivity to determine the location of the drill string and thereby the borehole in the substantially horizontal stratum. From this, the direction of drilling can be corrected or adjusted so that the borehole is maintained within the desired stratum. The resistivity sensor typically comprises a transmitter and a plurality of receivers in what is commonly referred to as a multiple propagation resistivity (MPR) tool. Measurements may be made with propagation sensors that operate in the 400 kHz and higher frequency.

A limitation of the method and apparatus used by Wu is that resistivity sensors are responsive to oil/water contacts for relatively small distances, typically no more than 5 m; at larger distances, conventional propagation tools are not responsive to the resistivity contrast between water and oil. One solution that can be used in such a case is to use an induction logging that typically operates in frequencies between 10 kHz and 50 kHz. U.S. Pat. No. 6,308,136 to Tabarovsky et al having the same assignee as the present application and the contents of which are fully incorporated herein by reference, teaches a method of interpretation of induction logs in near horizontal boreholes and determining distances to boundaries in proximity to the borehole.

An alternative approach to determination of distances to bed boundaries is disclosed in U.S. patent application Ser. No. 10/373,365 of Merchant et al. Taught therein is the use of multicomponent induction logging tools and measurements as an indicator of a distance to a bed boundary and altering the drilling direction based on such measurements. In conventional induction logging tools, the transmitter and receiver antenna coils have axes substantially parallel to the tool axis (and the borehole). The antenna configuration of the multicomponent tool of Merchant et al. is illustrated in FIG. 3.

FIG. 3 (prior art) shows the configuration of transmitter and receiver coils in the 3DExplorer™ (3DEX) induction logging instrument of Baker Hughes. Three orthogonal transmitters 201, 203, and 205 that are referred to as the $T_x$, $T_z$, and $T_y$ transmitters are placed in the order shown. The three transmitters induce magnetic fields in three spatial directions. The subscripts (x, y, z) indicate an orthogonal system substantially defined by the directions of the normal to the coils of the transmitters. The z-axis is chosen to be along the longitudinal axis of the tool, while the x-axis and y-axis are mutually perpendicular directions lying in the plane transverse to the axis. Corresponding to each transmitter 201, 203, and 205 are associated receivers 211, 213, and 215, referred to as the $R_x$, $R_z$, and $R_y$ receivers, aligned along the orthogonal system defined by the transmitter normals, placed in the order shown in FIG. 1. $R_x$, $R_z$, and $R_y$ are responsible for measuring the corresponding magnetic fields $H_{xx}$, $H_{zz}$, and $H_{yy}$. Within this system for naming the magnetic fields, the first index indicates the direction of the transmitter and the second index indicates the direction of the receiver. In addition, the receivers $R_y$ and $R_z$, measure two cross-components, $H_{xy}$ and $H_{xz}$, of the magnetic field produced by the $T_x$ transmitter (201). This embodiment of the invention is operable in single frequency or multiple frequency modes. It should further be noted that the description herein with the orthogonal coils and one of the axes parallel to the tool axis is for illustrative purposes only. Additional components could be measured, and, in particular, the coils could be inclined at an angle other than 0° or 90° to the tool axis, and furthermore, need not be orthogonal; as long as the measurements can be "rotated" or "projected" onto three orthogonal axes, the methodology described herein is applicable. Measurements may also be made at a plurality of frequencies, and/or at a plurality of transmitter-receiver distances.

While the teachings of Merchant are show that the 3DEX™ measurements are very useful in determination of distances to bed boundaries (and in reservoir navigation), Merchant discusses the reservoir navigation problem in terms of measurements made with the borehole in a substantially horizontal configuration (parallel to the bed boundary). This may not always be the case in field applications where the borehole is approaching the bed boundary at an angle. In a situation where the borehole is inclined, then the multicomponent measurements, particularly the cross-component measurements, are responsive to both the distance to the bed boundary and to the anisotropy in the formation.

It would be desirable to have a method of determination of distance to a bed boundary in a deviated well. The present invention satisfies this need.

SUMMARY OF THE INVENTION

One embodiment of the present invention is a method of developing a reservoir in an earth formation. The method includes conveying a bottomhole assembly (BHA) into a borehole in the earth formation and obtaining azimuthally sensitive propagation resistivity measurements. A feature such as an electrical midpoint or an electrical saddle-point is identified on the azimuthally sensitive propagation resistivity measurements. A geometric relation of a position of the BHA to a bed boundary is identified using the identified feature. The azimuthally sensitive measurements may be obtained using at least one transmitter and at least one receiver on a logging tool on the BHA. Obtaining the azimuthally sensitive resistivity measurements may be based on use of a coordinate transformation. When the identified feature is an electrical midpoint, the geometric relation may be a position of the BHA relative to a shoulder bed. When the identified feature is a saddle point, the identified geometric relation may be a "V" shaped well path, a cascaded resistivity profile, a curved bed boundary and/or a fault. The method may further include controlling a drilling direction of the BHA using the identified geometric relation. Controlling the drilling direction may involve staying below a shale roof, staying above an oil-water contact, identifying an azimuth and a distance of a resistivity boundary in the earth formation, avoiding a shale lens and/or avoiding a calcite stringer. Obtaining the azimuthally sensitive measurements may further include correcting for an eccentering of the logging tool in the borehole. Obtaining the azimuthally sensitive measurements may further include correcting for a bending of the logging tool in the borehole.

Another embodiment of the invention is a method of evaluating an earth formation. The method includes conveying a bottomhole assembly into a borehole in the earth formation. Azimuthally sensitive propagation resistivity measurements are obtained. The azimuthally sensitive measurements are combined with background measurements to provide an image of the earth formation. The azimuthally sensitive measurements may be obtained using at least one transmitter and at least one receiver on a logging tool on the BHA. The azimuthally sensitive measurements may be obtained using a coordinate transformation. The background measurements may be based on propagation resistivity measurements or measurements made with tilted coils. The image is indicative of a direction to a bed boundary relative to the borehole. Combining the azimuthally sensitive measurements and the azimuthally insensitive measurements may be done using a conductivity contrast at a bed boundary estimated using the azimuthally insensitive measurements. A direction of drilling may be controlled using the image. Controlling the drilling direction may involve staying below a shale roof, staying above an oil-water contact, identifying an azimuth and a distance of a resistivity boundary in the earth formation, avoiding a shale lens and/or avoiding a calcite stringer.

Another embodiment of the invention is an apparatus for developing a reservoir in an earth formation. The apparatus includes a bottomhole assembly conveyed into a borehole in the earth formation. A logging tool on the BHA obtains azimuthally sensitive propagation resistivity measurements. A processor identifies a feature such as an electrical midpoint or an electrical saddle point in the azimuthally sensitive measurements and identifies a geometric relation of a position of the BHA relative to a bed boundary in the earth formation. The azimuthally sensitive measurements may be obtained using at least one transmitter and at least one receiver on a logging tool on the BHA. The processor may apply a coordinate transformation to measurements made by the at least one transmitter and the at least one receiver. When the identified feature is an electrical midpoint, the identified geometric relation may be a position of the BHA relative to a shoulder bed. When the identified feature is a saddle point, the identified geometry is a "V" shaped well path, a cascaded resistivity profile, a curved bed boundary and/or a fault. The processor may further control a drilling direction of the BHA using the identified geometric relation. The processor may control the drilling direction by staying below a shale roof, staying above an oil-water contact, identifying an azimuth and a distance of a resistivity boundary in the earth formation, avoiding a shale lens and/or avoiding a calcite stringer. The apparatus may include an additional coil, the output of which may be used for correcting for an eccentering of the logging tool in the borehole. The apparatus may include an additional coil, the output of which may be used for correcting for a bending of the logging tool.

Another embodiment of the invention is an apparatus for evaluating an earth formation. The apparatus includes a bottomhole assembly conveyed in a borehole in the earth formation. A logging tool is used to obtain azimuthally sensitive propagation resistivity measurements. A processor combines the azimuthally sensitive measurements with background measurements to provide an image of the earth formation. The azimuthally sensitive measurements may be obtained using at least one transmitter and at least one receiver on a logging tool on the BHA. The processor may apply a coordinate transformation of the measurements. The background measurements may be derived from propagation resistivity measurements or a tool with tilted coils. The image may be indicative of a direction of a bed boundary relative to the borehole. The processor may combined the azimuthally sensitive and the azimuthally insensitive measurements using a conductivity contrast at a bed boundary estimated using the azimuthally insensitive measurements. The processor may further control a direction of drilling of the BHA. The control of the drilling direction may involve staying below a shale roof, staying above an oil-water contact, identifying an azimuth and a distance of a resistivity boundary in the earth formation, avoiding a shale lens and/or avoiding a calcite stringer.

Another embodiment of the invention is a method of evaluating an earth formation. The method includes conveying a BHA into a borehole in the earth formation and obtaining azimuthally sensitive propagation resistivity measurements using at least one transmitter and at least one receiver on a logging tool, at least one of the coils surrounding a longitudinal axis of the logging tool. The azimuthally sensitive measurements are used to provide an image of the earth formation. The image may be obtained by combining the azimuthally sensitive measurements with background measurements.

Another embodiment of the invention is an apparatus for evaluating an earth formation. A logging tool having at least one transmitter coil and at least one receiver coil is used for obtaining azimuthally sensitive propagation resistivity measurements. At least one of the coils surrounds a longitudinal axis of the logging tool. A processor uses the azimuthally sensitive measurements to provide an image of the earth formation. The processor may provide the image by combining the azimuthally sensitive measurements with background measurements.

BRIEF DESCRIPTION OF THE DRAWINGS

For detailed understanding of the present invention, reference should be made to the following detailed description of the preferred embodiment, taken is conjunction with the accompanying drawings, in which like elements have been given like numerals and wherein.

DETAILED DESCRIPTION OF THE INVENTION

Figure 1:
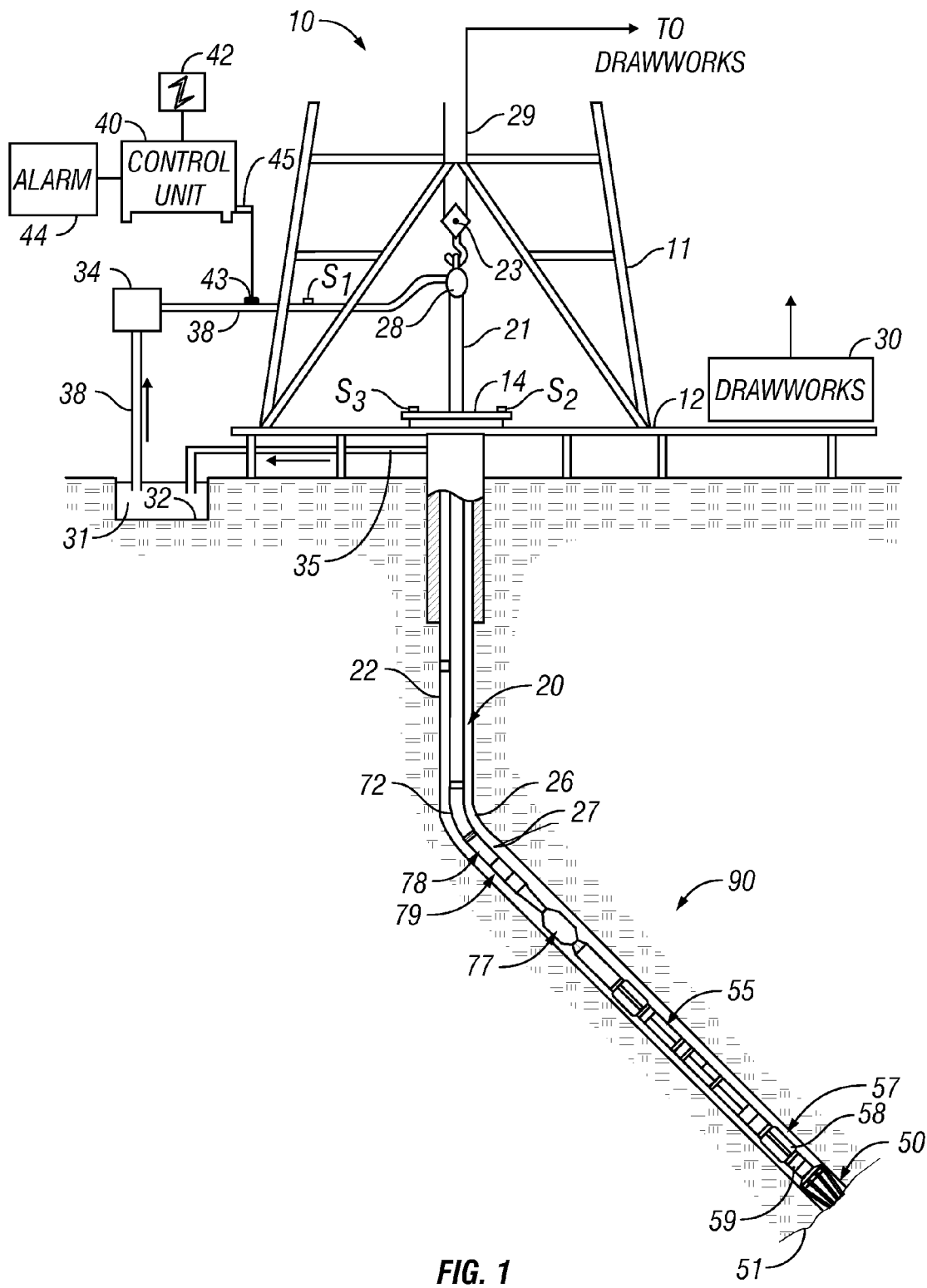
FIG. 1 (prior art) shows a schematic diagram of a drilling system having a drill string that includes a sensor system according to the present invention.
Figure 2:
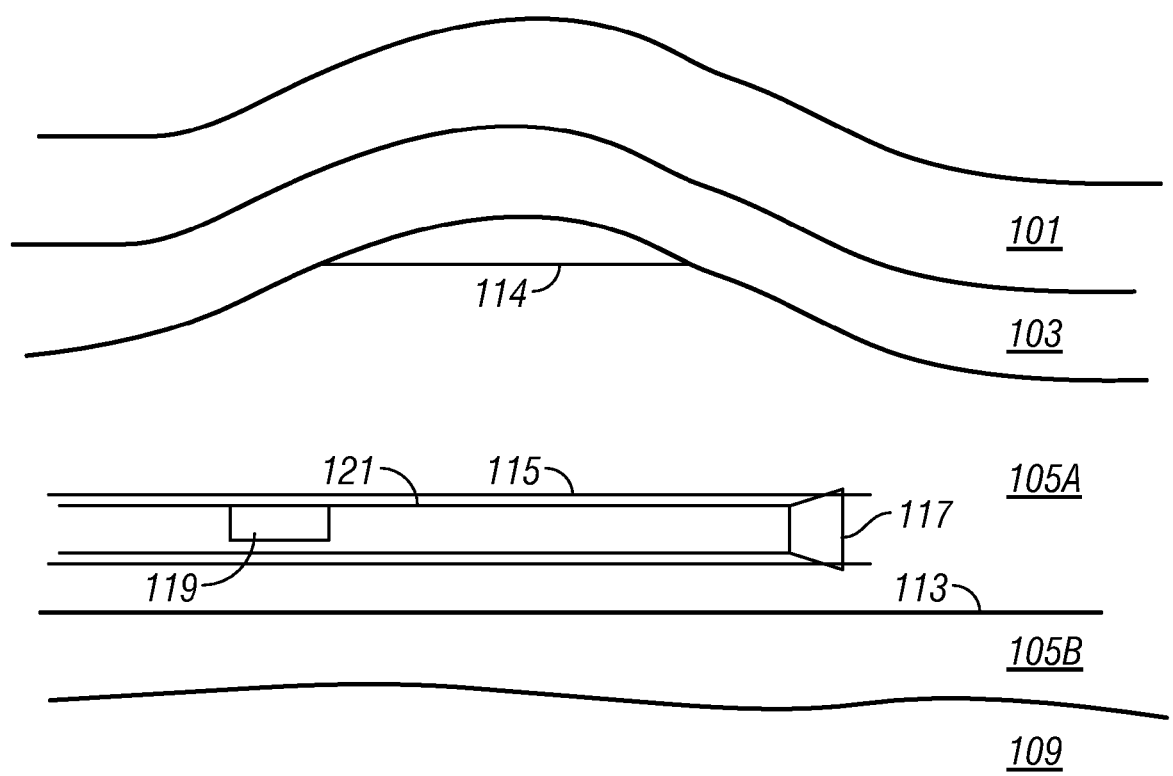
FIG. 2 (prior art) is an illustration of a substantially horizontal borehole proximate to an oil/water contact in a reservoir.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the draw-works is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Figure 3:
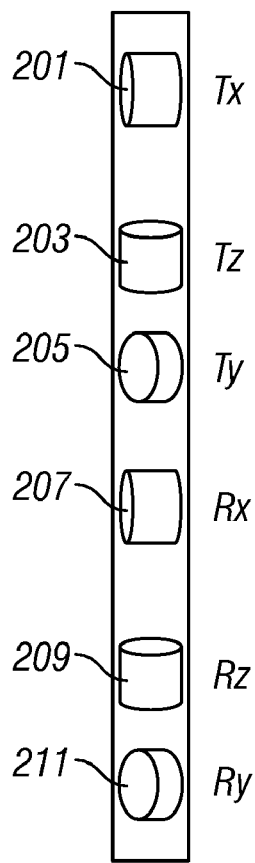
FIG. 3 (prior art) illustrates the 3DEX™ multi-component induction tool of Baker Hughes Incorporated.
Figure 4:
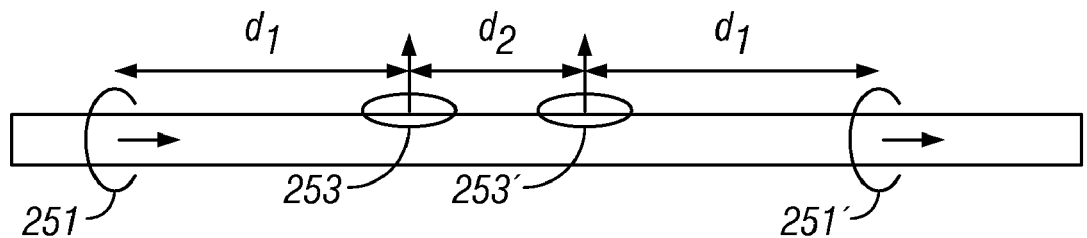
FIG. 4 illustrates the transmitter and receiver configuration of the AZMRES tool suitable for use with the method of the present invention.

FIG. 4 shows an azimuthal resistivity (referred to hereafter as AZMRES) tool configuration suitable for use with the method of the present invention. This is a modification of the basic 3DEX tool of FIG. 3 and comprises two transmitters 251, 251' whose dipole moments are parallel to the tool axis direction and two receivers 253, 253' that are perpendicular to the transmitter direction. In one embodiment of the invention, the tool operates at 400 kHz frequency. When the first transmitter fires, the two receivers measure the magnetic field produced by the induced current in the formation, and so does the second transmitter. The signals are combined in following way:

$$H_{T1} = H_2 - (d_1/(d_1+d_2))^3 \cdot H_1$$

$$H_{T2} = H_1 - (d_1/(d_1+d_2))^3 \cdot H_2 \qquad (1).$$

Here, $H_1$ and $H_2$ are the measurements from the first and second receivers, respectively, and the distances $d_1$ and $d_2$ are as indicated in FIG. 4. The AZMRES tool rotates with the BHA and in an exemplary mode of operation, makes measurements at 16 angular orientations 22.5° apart. The measurement point is at the center of two receivers. In a uniform, isotropic formation, no signal would be detected at either of the two receivers. The invention thus makes use of cross component measurements, called principal cross-components, obtained from a pair of longitudinal transmitters disposed on either side of at least one transverse receiver. It should further be noted that using well known rotation of coordinates, the method of the present invention also works with various combinations of measurements as long as they (i) correspond to signals generated from opposite sides of a receiver, and, (ii) can be rotated to give the principal cross components.

The dual transmitter configuration has been discussed in U.S. patent application Ser. No. 11/298,255 of Yu et al., having the same assignee as the present invention and the contents of which are incorporated herein by reference.

Figure 5A:
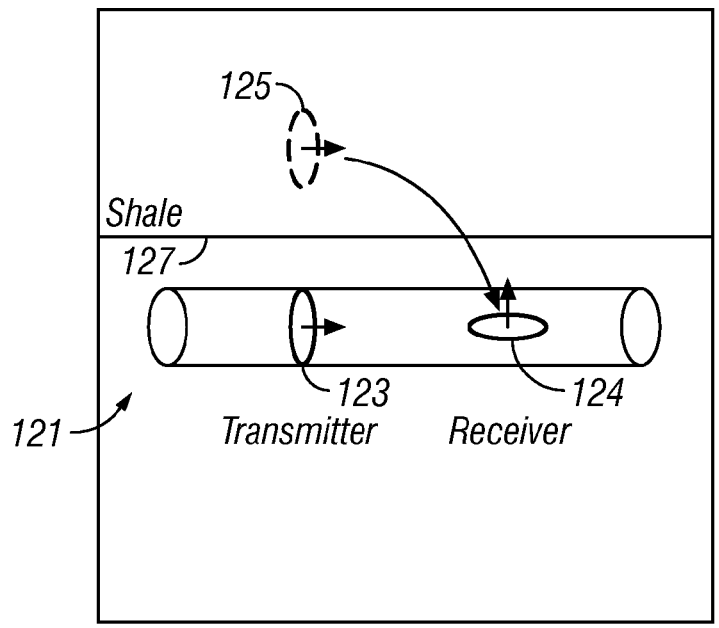
FIGS. 5a, 5b illustrate the directional sensitivity of the tool of FIG. 4.
Figure 5B:
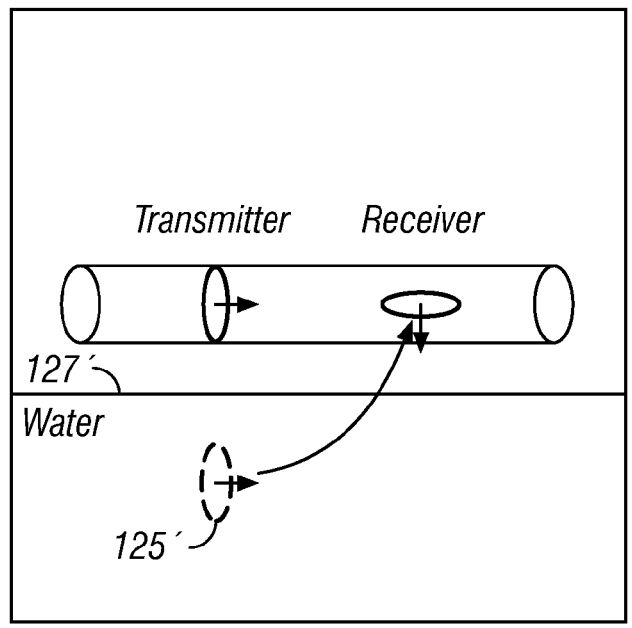

The new azimuthal resistivity measurement is based on a simple observation that the responses of a pair of cross coils for the scenarios in FIGS. 5a and 5b will have opposite signs. Consider an axial transmitter coil 123 and a transverse receiver coil 124 on a tool 121. When the transmitter and receiver coils are perfectly aligned, the direct coupling will be zero. The only contribution to the signal at the receiver comes from the remote bed 127 that can be approximated with a mirror image 125 of the transmitter coil. If the remote bed is conductive, the mirror transmitter will have the same moment direction as the real transmitter. This also is true if the remote bed 127' is below the transmitter, as shown in FIG. 5b. However, the secondary fields produced by the mirror image 125' in FIG. 5b will have an opposite polarity to that produced by the mirror image 125 in FIG. 5a. These measurements will be referred to in this document as azimuthally sensitive propagation resistivity measurements and refer to measurements corresponding to a z-transmitter and a transverse receiver. These may be made with an actual transmitter-receiver pair or may be derived from other transmitter-receiver combinations through coordinate rotation. It should be noted that by the principle of reciprocity, the term "azimuthally sensitive propagation resistivity measurements" also refers to measurements made with or derived from an axial receiver and a transverse transmitter.

Figure 6B:
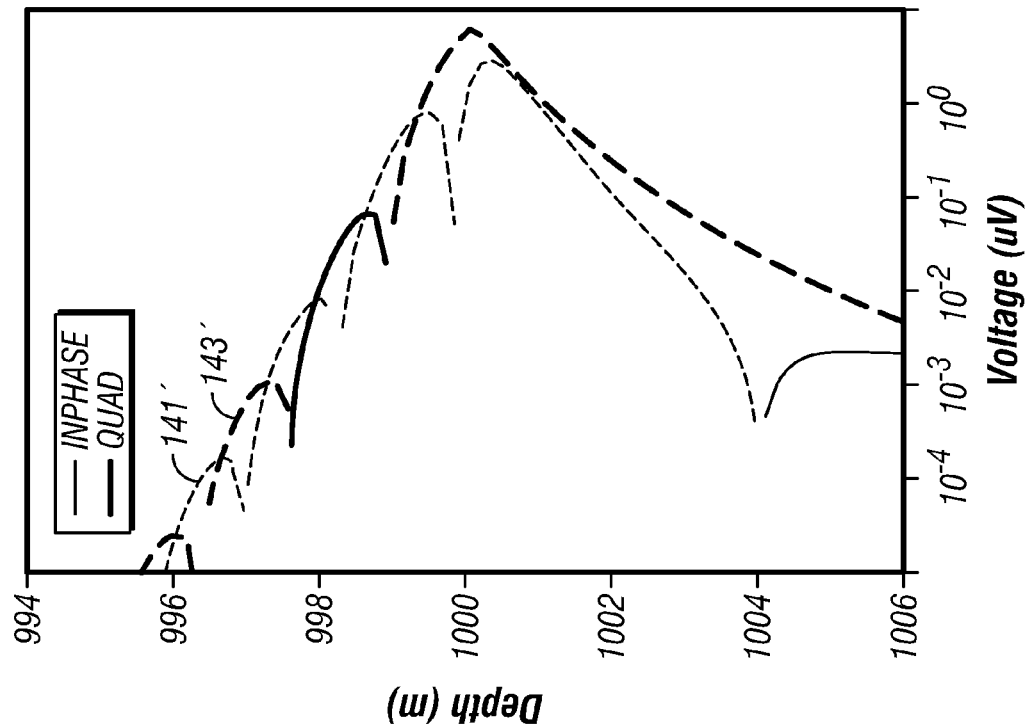
FIGS. 6a, 6b show the cross-component responses to (a) a resistive bed above a conductive bed and (b) a resistive bed below a conductive bed.
Figure 6A:
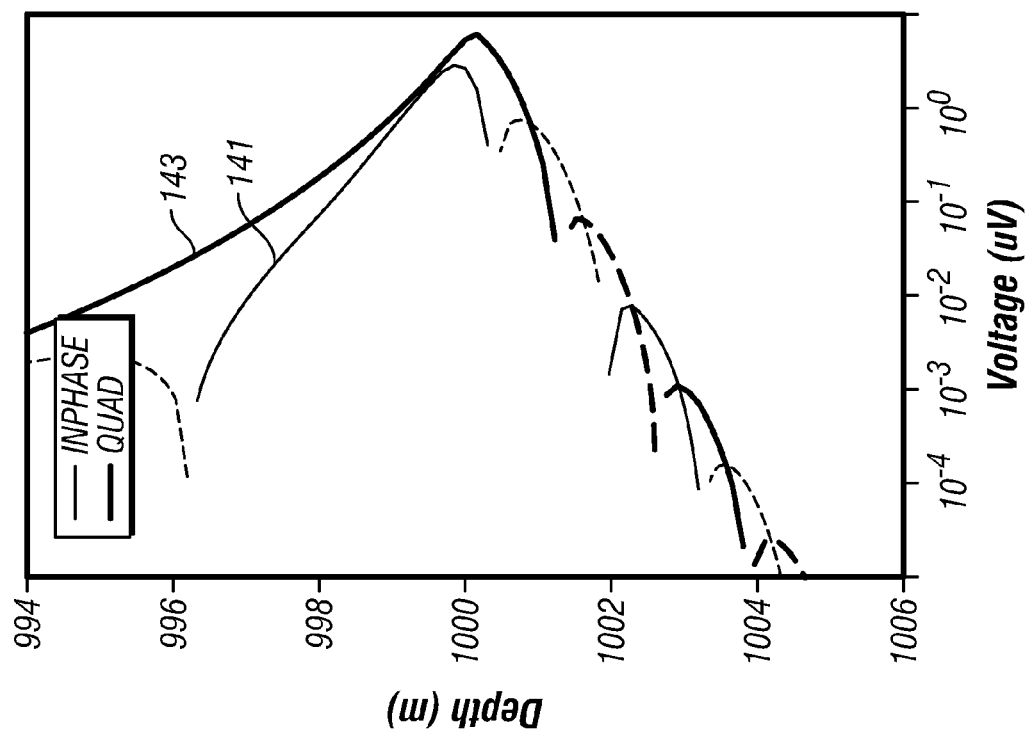

The above observation is further illustrated with examples shown in FIGS. 6a and 6b. FIG. 6a shows the cross-component response to a resistive bed above a conductive bed. FIG. 6b shows the response to a resistive bed below a conductive bed. The conductive and resistive bed resistivities are 1 and 100 Ω-m, respectively. The tool moves with its axis parallel to the bed boundary. The responses above 1000 m in FIG. 6a are the mirror images of those in FIG. 6b below 1000 m. The quadrature component 143, 143' has simpler characteristics than the in-phase component 141, 141' in that the former has the same sign as the tool crosses the boundary. This property makes the quadrature component more useful for data interpretation. Note that the dashed curves in FIGS. 6a, 6b have opposite polarity to the solid curves.

Figure 7A:
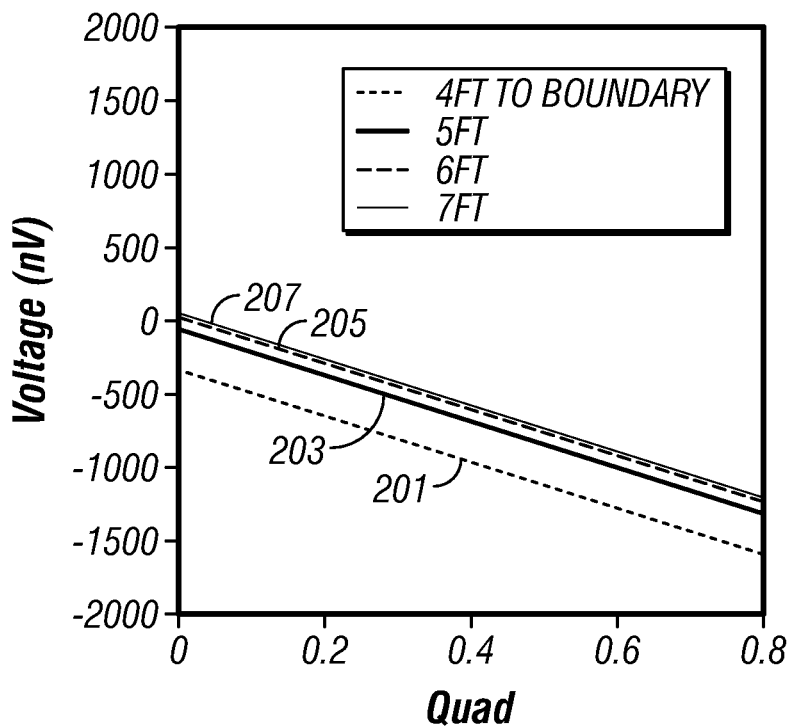
FIGS. 7a-7d show the tool eccentricity effect on the azimuthal resistivity measurement for the in-phase and quadrature component with and without bucking.
Figure 7B:
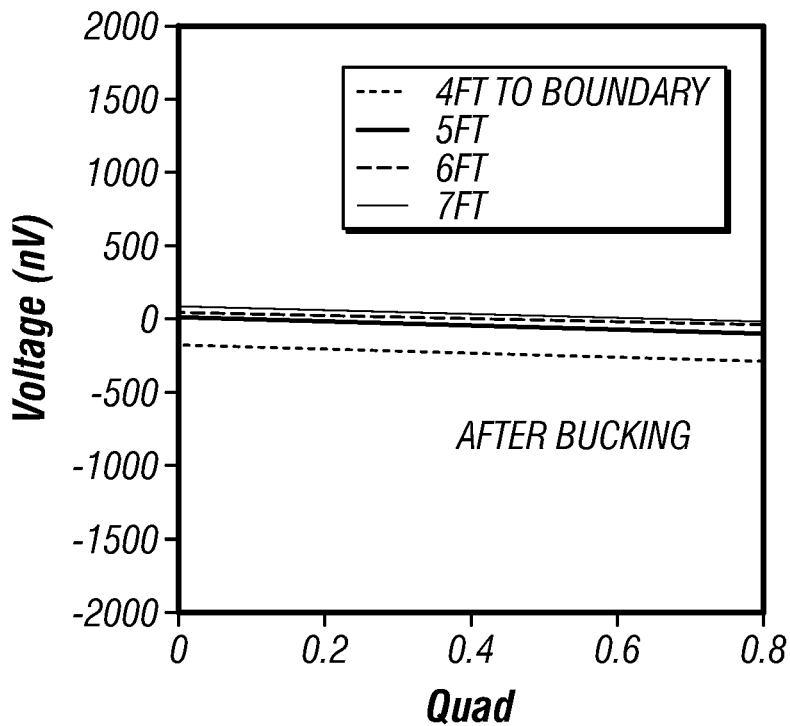

The borehole will affect the azimuthal resistivity measurement only if the tool is decentralized. To illustrate the magnitude of the effect, we consider a decentralized tool in an 8.5 in borehole adjacent to a remote bed of 1 Ω-m. The tool outer diameter is 6.75 in. FIGS. 7a and 7b show the in-phase responses as a function of tool eccentricity, calculated with a finite-difference method. The borehole fluid is 1000 Ω-m.

Figure 7C:
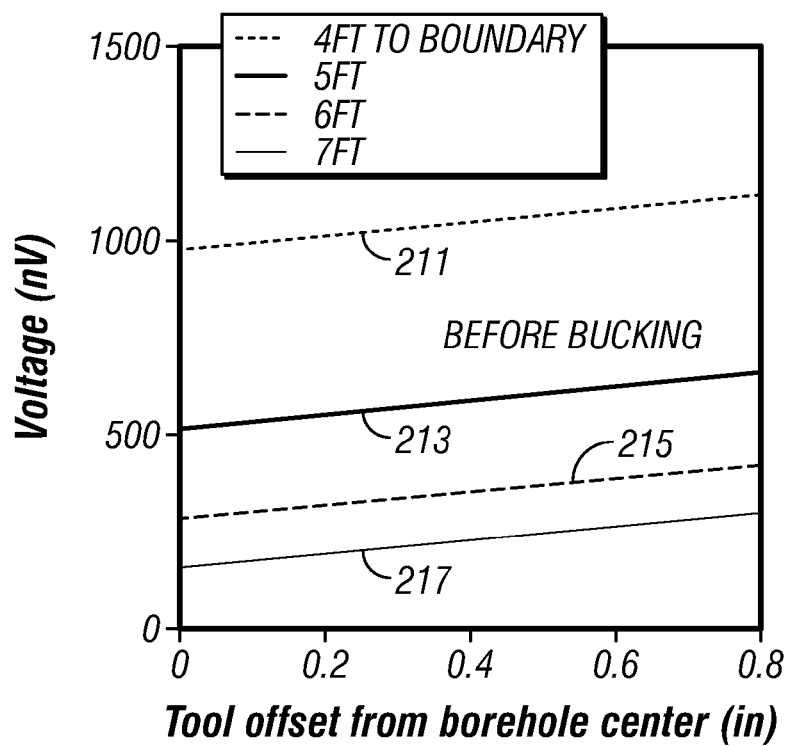
Figure 7D:
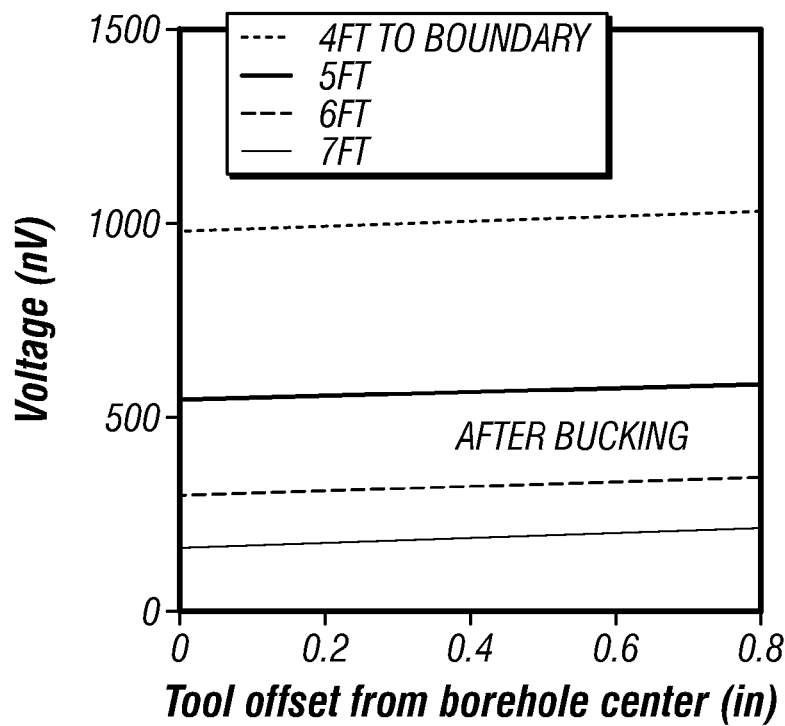

The abscissa is the distance of the center of the tool from the center of the borehole (eccentering). The curves 201, 203, 205, 207 show the in-phase components of the signal without bucking for distances of 4, 5, 6 and 7 ft. (1.22 m-2.13 m) to the bed boundary. (The last two curves are virtually indistinguishable). Corresponding curves in FIG. 7b show that with the bucking, there is little sensitivity to eccentering FIG. 7c shows the quadrature components without bucking for distances of 4, 5, 6 and 7 ft to the bed boundary FIG. 7d shows the quadrature components after bucking.

We observe that both the in-phase and the quadrature components can be severely distorted by tool eccentricity, especially when the tool is far from the bed boundary. The bucking-coil system eliminates or minimizes the impact of eccentricity on the quality of the measurement.

There is a simple explanation for the reduction in eccentricity effects with a bucking-coil system. The effect of an eccentric tool can be approximated by an image transmitter placed symmetrically with respect to the borehole wall. Because of the proximity of the image transmitter to the tool axis, the response decays roughly as $1/r^3$. Therefore, the image transmitter response can be bucked the same way as for the direct coupling.

Figure 8A:
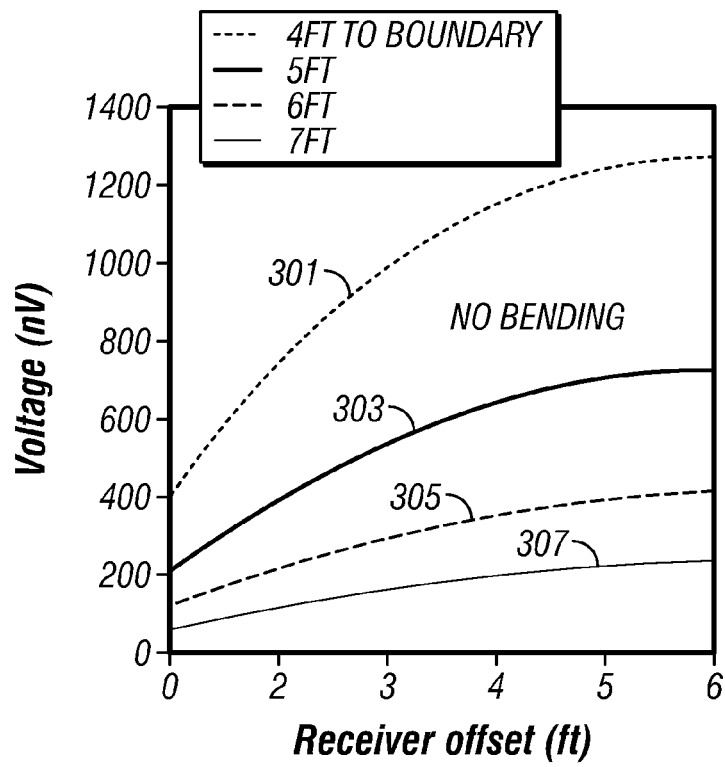
FIGS. 8a-8c show the tool bending effect on the azimuthal resistivity measurement before and after bucking.
Figure 8B:
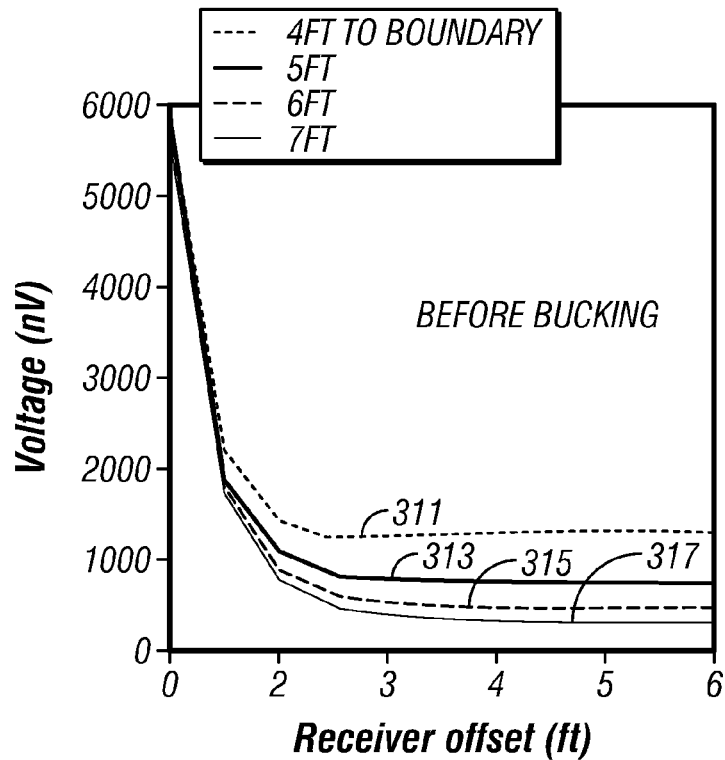
Figure 8C:
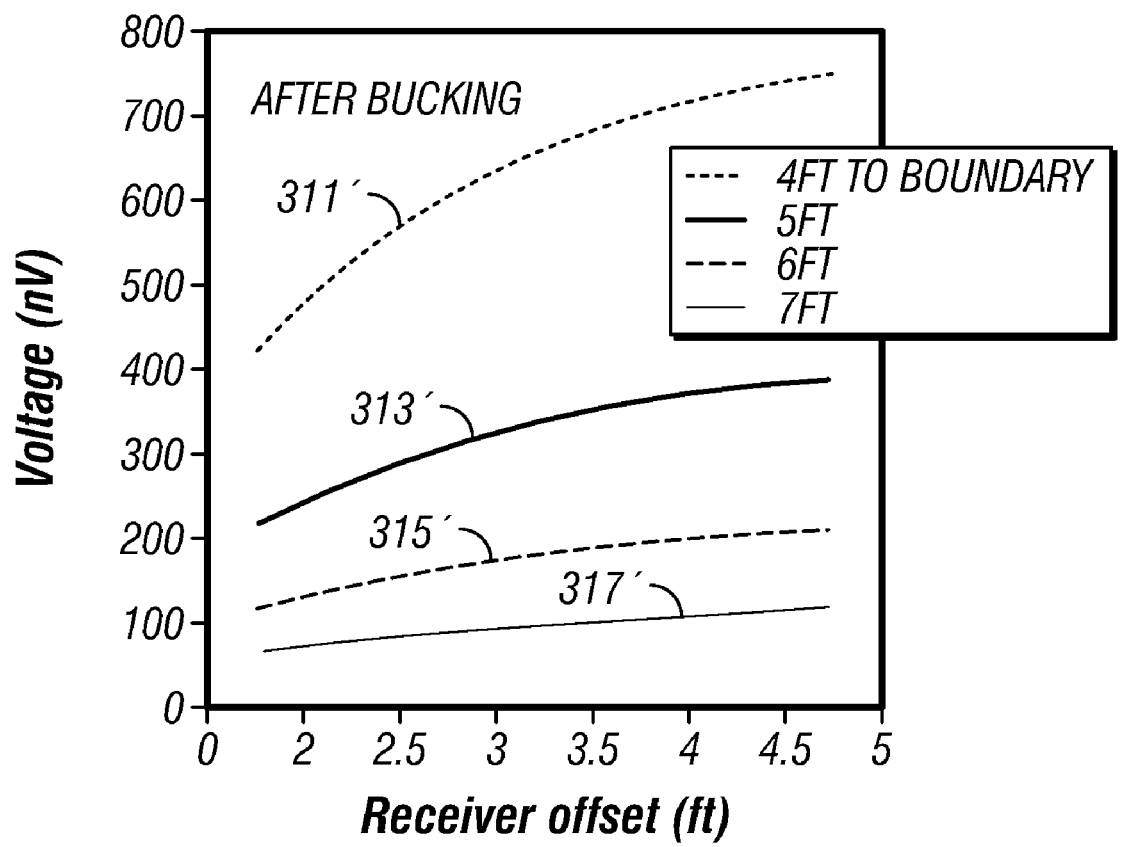

Those versed in the art and having the benefit of the present disclosure would recognize that tool bending can have an effect on the measurements. The tool bending effect can be more severe for the azimuthal resistivity tool than for a conventional, coaxial tool because bending will introduce direct coupling between the transmitter and receiver coils, whereas a coaxial coil tool is relatively insensitive to tool bending. A strong direct coupling may destroy the sign reversal property of the azimuthal measurement as mentioned earlier. A bent tool will produce coplanar and/or coaxial coupling. The field produced by both types of coupling in the air falls as $1/r^3$. Hence, the coupling can be bucked out. FIG. 8a shows the quadrature component responses 301, 303, 305, 307 as a function of transmitter-receiver distance ranging from 1 ft.-6 ft (0.3 m-1.8 m) for bed boundaries at distances of 4, 5, 6 and 7 ft (1.22-2.13 m). The responses in FIG. 8a correspond to a straight tool with no bending. FIG. 8b shows the responses 311, 313, 315, 317 for the same distances when the tool is bent at 4°/100 ft (13.1°/100 m). FIG. 8c shows the responses for the bent tool when bucking is used. As can be seen, the curves 311', 313', 315' and 317' are very similar to the curves 301, 303, 305, 307 for the straight tool. Obviously, the bucked responses restore the characteristics of the original responses.

High downhole temperatures and temperature variations may cause the two receivers to read differently during measurement. For existing LWD resistivity tools, temperature effects are often compensated with the use of dual, symmetric transmitters. The same compensation method is used for the azimuthal resistivity measurement.

Figure 9A:
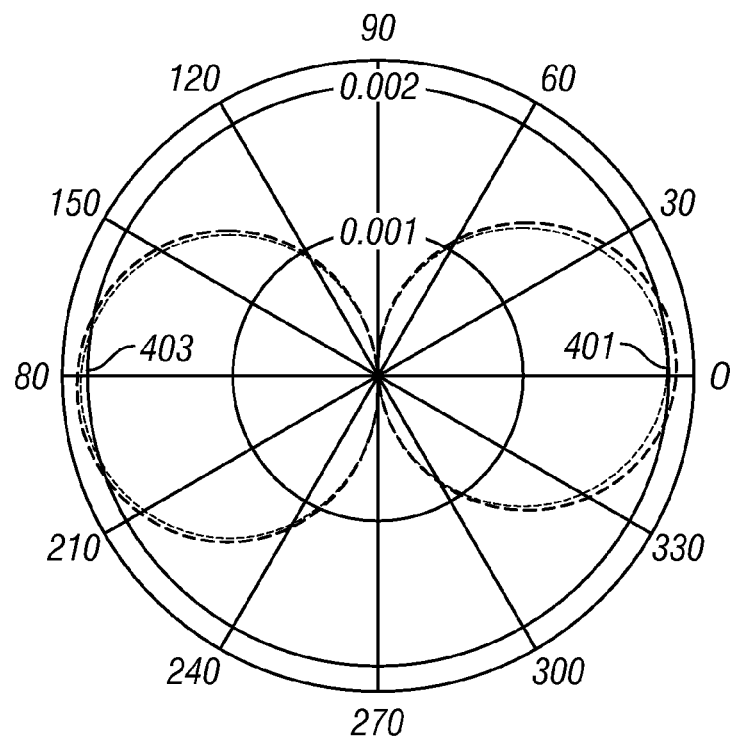
FIGS. 9a-9b show amplitude and phase measurements from a water tank test with the tool offset from the tank center.
Figure 9B:
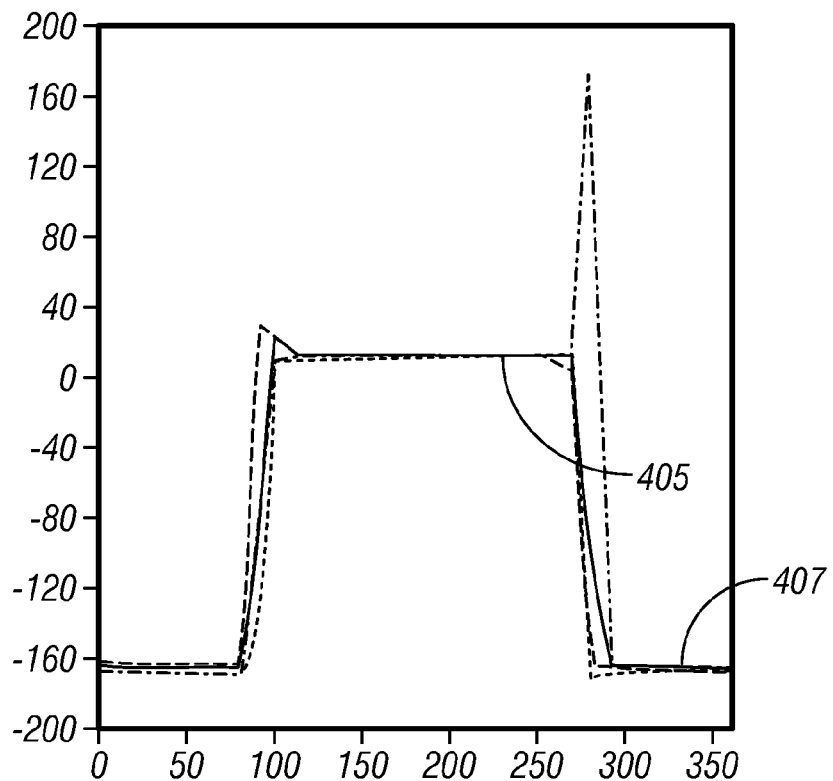

With a rotating tool string, it is possible to acquire data at various tool face angles. The measurements made by the rotating tool are combined with orientation measurements made by a suitable orientation sensor and binned into 16 sectors evenly spaced over 360°. The 16 sectors result in an azimuthal resolution of 22.5°. The maximum signal occurs when the receiver coil plane is parallel to a bed boundary. The signal will be the minimum (zero) when the receiver coil plane is normal to the bed boundary. Opposing sectors will have the same signal strength. These features are shown in FIGS. 9a-9b for a tank test.

The tank is cylindrical and filled with conductive water. The tool is offset from the tank center. The amplitude attains the maximum value when the receiver coil face toward (0°) 401 and against (180°) 403 the nearest point of the tank edge. The amplitudes at other angles vary according to $\sin(\theta)$ where $\theta$ is the tool face angle. The phase measurements have only two distinct values 405, 407 which differ from each other by 180°. Clearly, the tank test can be performed at selected static orientations of the tool and does not require the binning that is used for downhole measurements.

Several important concepts have been developed to aid in data interpretation. The most important ones are electrical midpoints and electrical saddle points. An electrical midpoint is where the strength of the azimuthal signal crosses zero as its direction flips by 180°. A saddle point is where the magnitude of the signal dips to a minimum value, surrounded by two local maxima. The tool response at a saddle point may or may not be zero. Below, we give a few scenarios that can produce either electrical midpoints or saddle points.

Figure 10:
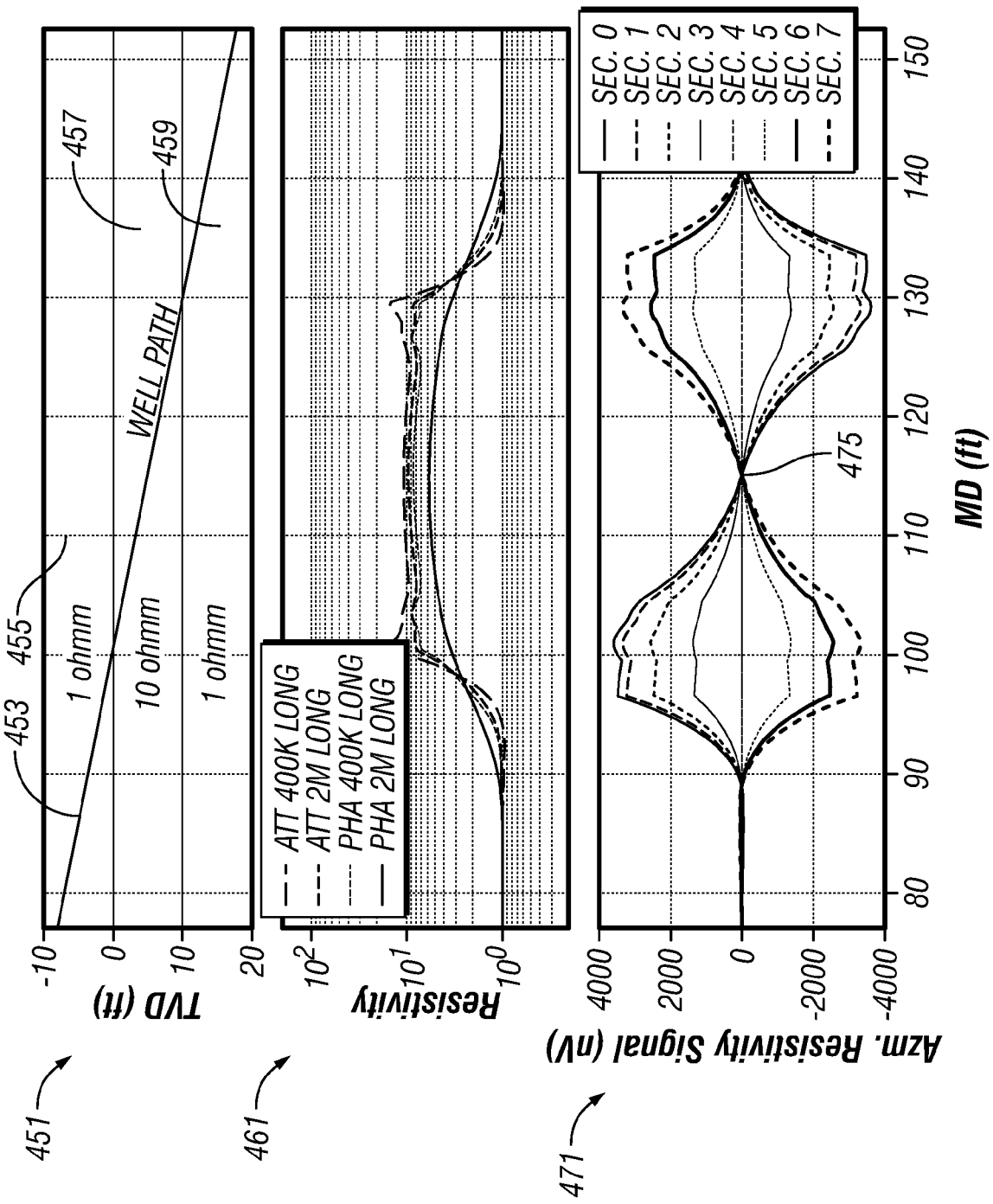
FIG. 10 shows an electrical midpoint in the azimuthal resistivity response when the well traverses two parallel shoulder beds having the same resistivity.

An electrical midpoint occurs when the tool is surrounded by two shoulder beds of the same or similar resistivity values. Signals from opposing beds cancel each other. The panel 451 of FIG. 10 illustrates a well path 453 which crosses from a layer 455 with a resistivity of 1 Ω-m into a layer 457 of resistivity 10 Ω-m back into a layer 459 of resistivity 1 Ω-m. The panel 461 shows the conventional propagation resistivity response for the amplitude and phase-derived resistivity at 400 kHz and 2 MHz. The individual curves are not labeled to simplify the illustration. The bottom panel 471 shows the response of the azimuthal tool at various angles. In this case, the electrical midpoint 475 coincides with the physical midpoint of the 10-ohmm bed 457 traversed by the borehole 453.

Figure 11:
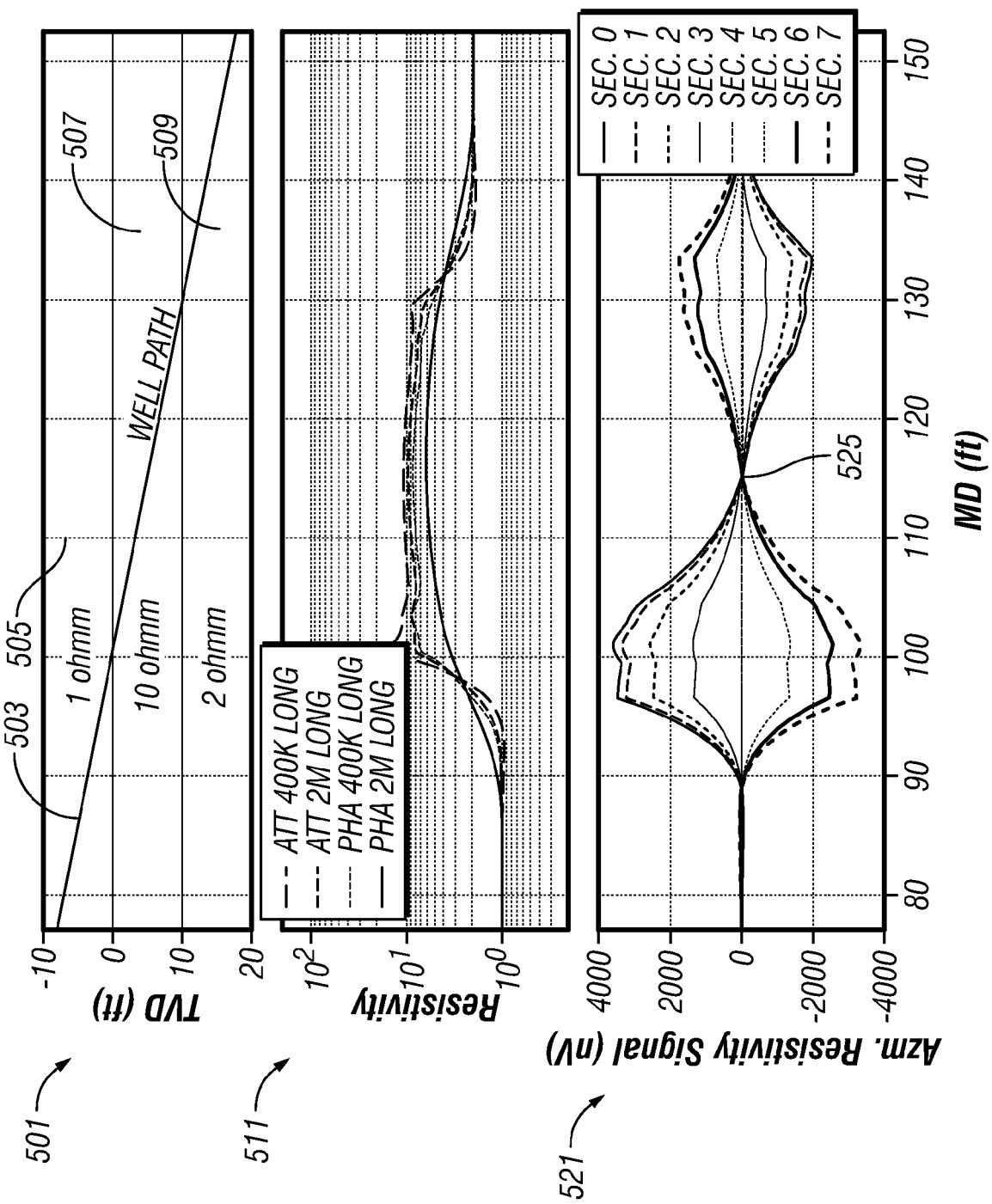
FIG. 11 is for the example of FIG. 10 with the lower should bed resistivity increased to 2 Ω-m.

When the shoulder beds have different resistivities the electrical midpoint moves away from the physical midpoint of the bed, toward the more resistive bed. The panel 501 of FIG. 11 illustrates a well path 503 which crosses from a layer 505 with a resistivity of 1 Ω-m into a layer 507 of resistivity 10 Ω-m into a layer 509 of resistivity 2 Ω-m. The panel 511 shows the conventional propagation resistivity response for the amplitude and phase-derived resistivity at 400 kHz and 2 MHz. The individual curves are not labeled to simplify the illustration. The bottom panel 521 shows the response of the azimuthal tool at various angles. In this case, the electrical midpoint 525 moves from 115 ft measured depth to about 117 ft measured depth, closer to the shoulder bed with smaller contrast.

Figure 12:
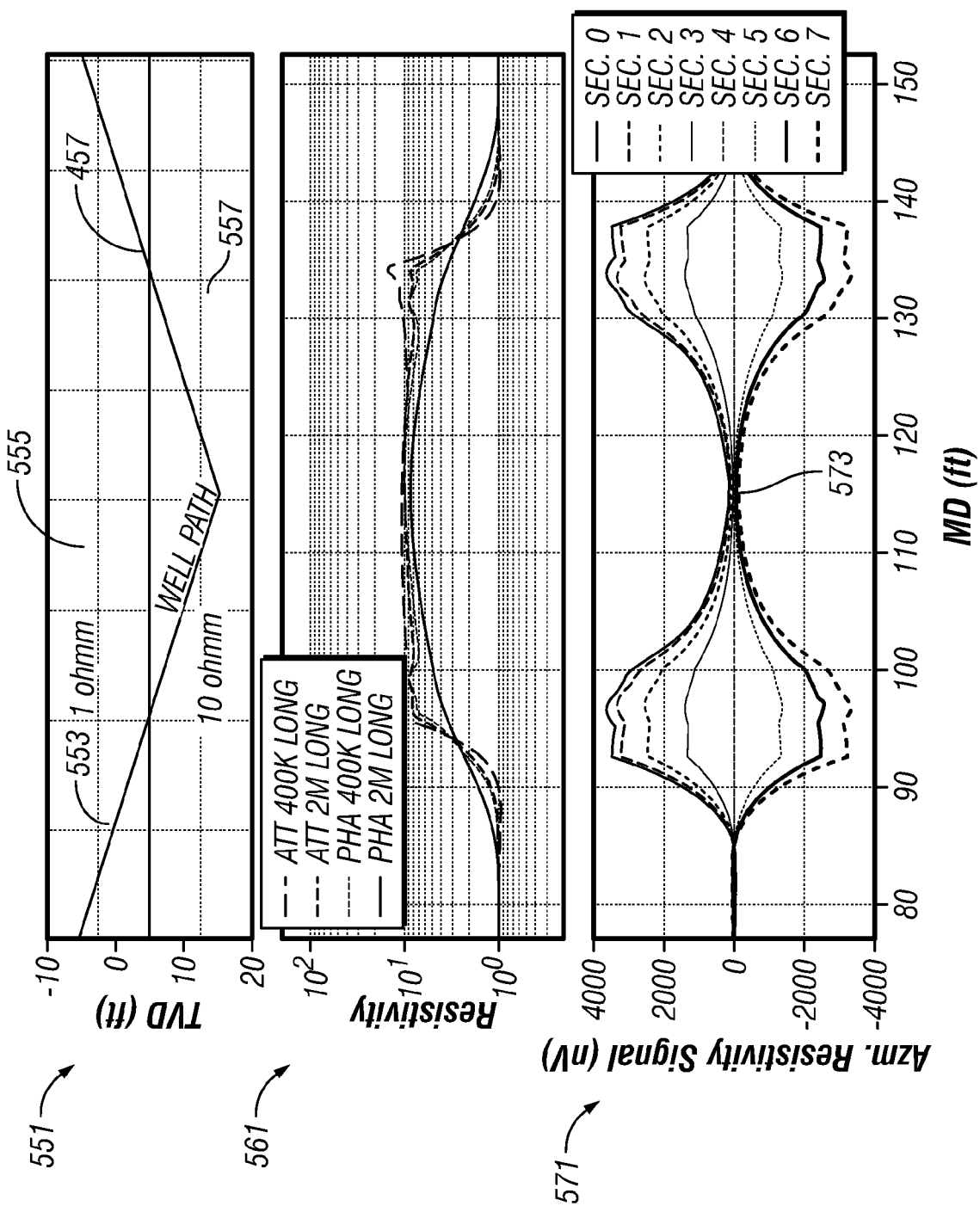
FIG. 12 illustrates a saddle point in the azimuthal resistivity response casued by a "V"-shaped well path.

A few scenarios can cause an electrical saddle point. As stated above, a saddle point occurs when the tool signal magnitude exhibits a local minimum. In order to have a saddle point, the tool response on both sides of the saddle point must have the same sign; otherwise, an electrical midpoint will result. The panel 551 of FIG. 12 shows a scenario in which the well-path 553 starts in a formation 555 of resistivity 1 Ω-m, enters a formation 557 of resistivity 10 Ω-m and reenters the upper formation 555. This "V"-shaped well path results in a minimum response 573 at the lowest point as seen in the panel 571. The middle panel 561 shows the conventional propagation resistivity response.

Figure 13:
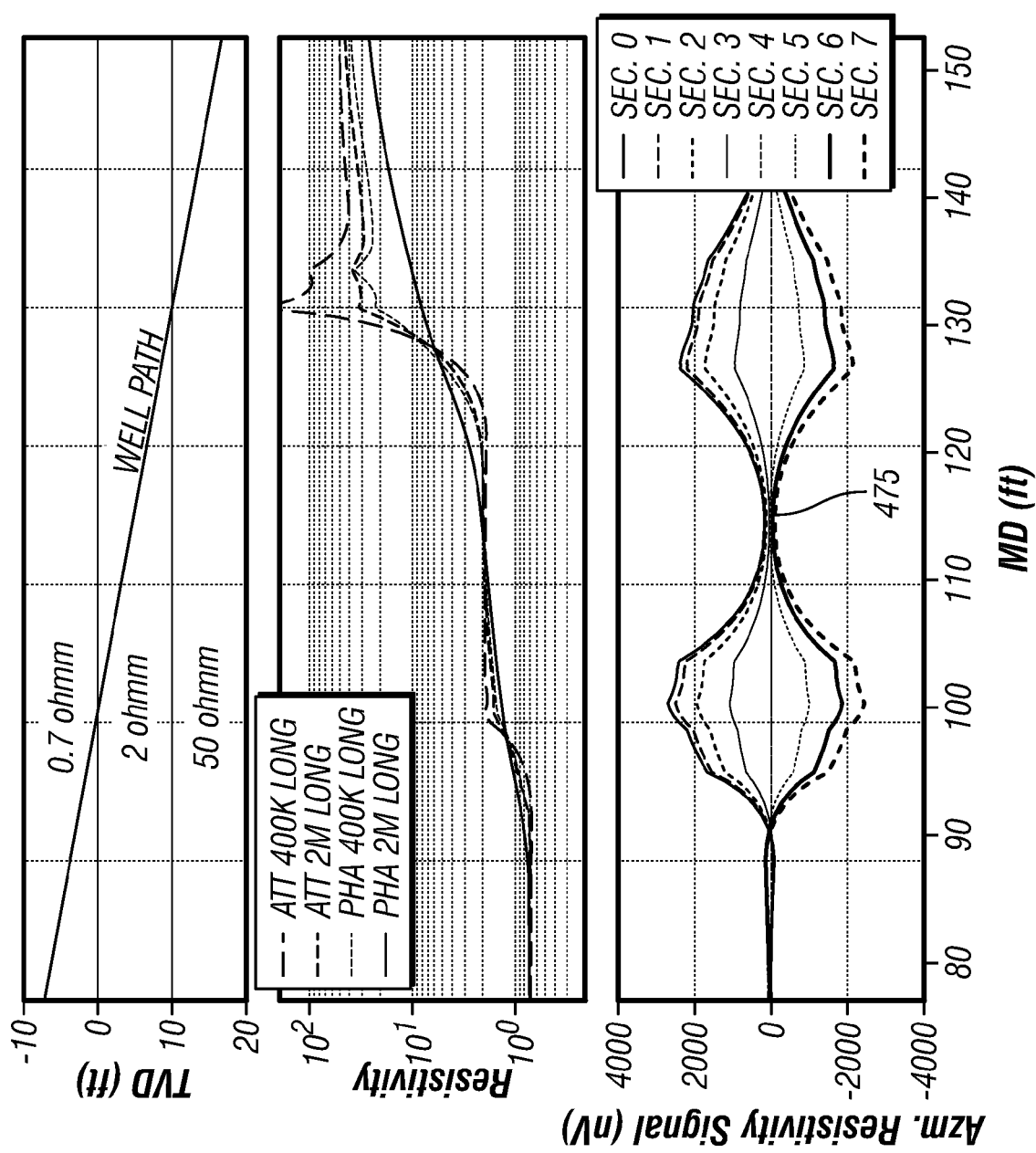
FIG. 13 illustrates a saddle point in the azimuthal resistivity response caused by a cascaded resistivity profile.

A cascaded resistivity profile can also generate a saddle point. In a cascaded resistivity profile the formation resistivity increases (or decreases) monotonically with depth. One example is shown in FIG. 13 where the bed resistivities increase from 0.7 Ω-m to 2 Ω-m at the top and to 50 Ω-m at the bottom. The relative well deviation is 70 degrees. The standard propagation resistivity shows the typical high-angle horn effect near the resistivity boundaries. In this model, the two peaks of the tool response have similar magnitudes because of the similar conductivity differences across the two boundaries.

Figure 14A:
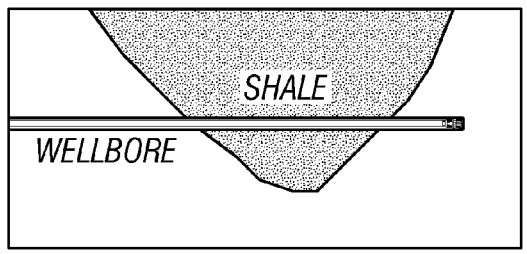
FIGS. 14a-14d illustrate several scenarios that may generate an electrical saddle point.
Figure 14B:
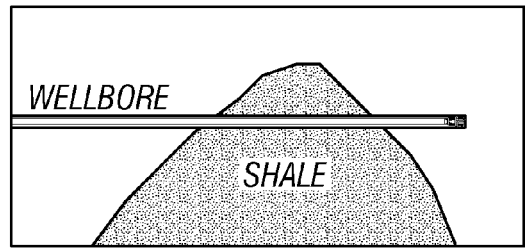
Figure 14C:
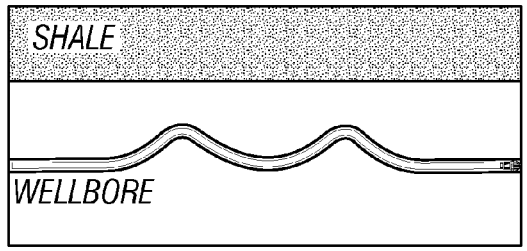
Figure 14D:
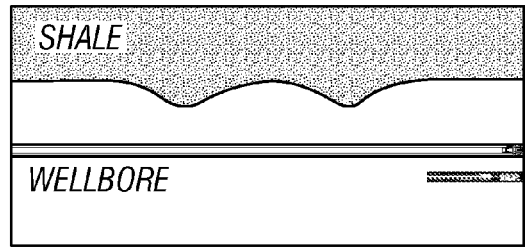

A curved boundary or a "porpoising" well may also cause a saddle point. In FIG. 14a, the well enters a roof from one side and exits through the roof from the other side. The tool exhibits the maximum responses when it crosses the boundaries and a minimum response between the crossovers. Because the responses at the crossovers have the same sign, the minimum response in between appears as a saddle point. Several other scenarios for a saddle point are demonstrated in FIG. 14b-d.

Figure 15:
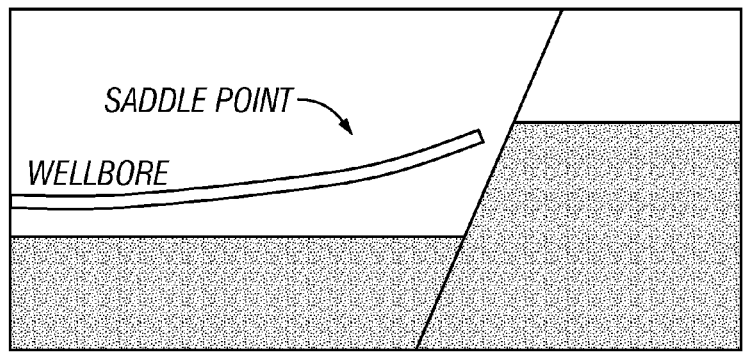
FIG. 15 illustrates a well trajectory near a fault that can cause a saddle point.

A special case including unparallel boundaries is a fault zone. A fault with the same or similar formations across the fault zone can produce a saddle point. As shown in FIG. 15, when the tool is close to the tip point of the hanging wall, a saddle point may occur. In this case, a saddle point indicates the transition from being close to the underlying formation to close to the fault zone or foot wall.

For the purposes of the present application, we refer to the electrical midpoint and the electrical saddle-point in the azimuthally sensitive propagation resistivity measurements as features. We further use the term "geometric relation' to refer to a relation between the position of the BHA and the location and properties of adjacent bed boundaries.

Figure 16A:
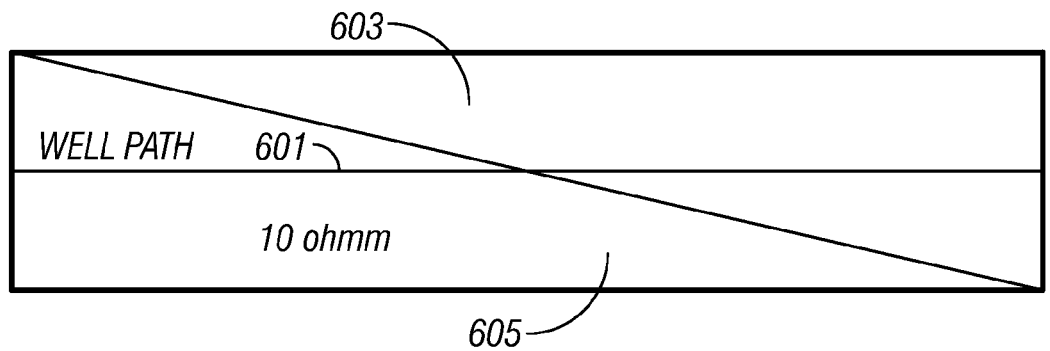
FIG. 16a-16c illustrates a well path moving from a conductive to a resistive bed, the standard propagation resistivity measurements and a pseudo-resistivity image.
Figure 16B:
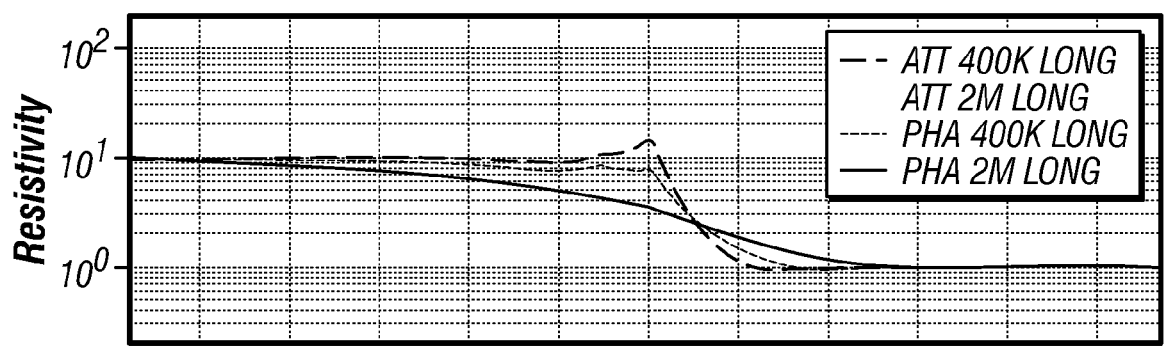
Figure 16C:
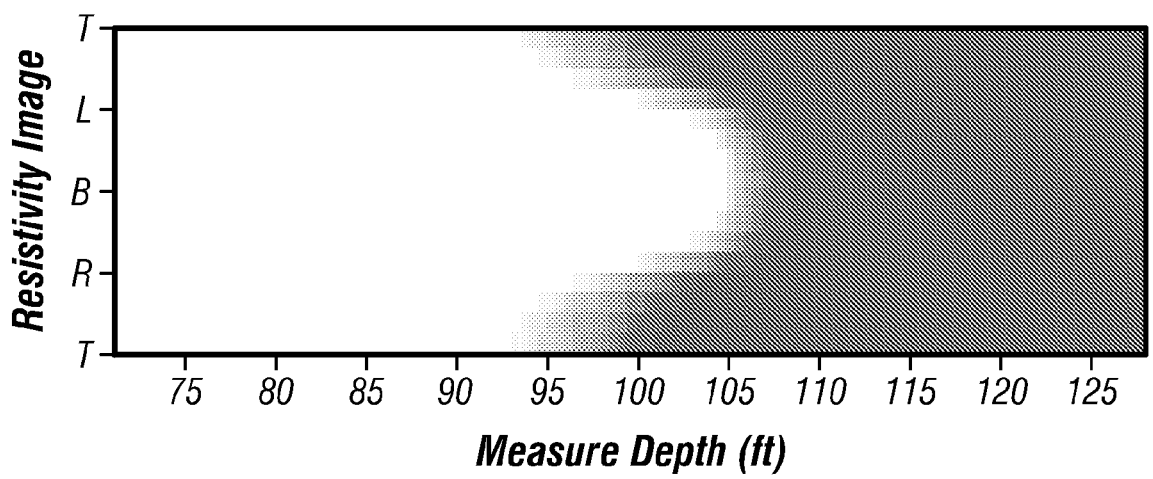

Because the azimuthal resistivity response in a thick, uniform formation is zero, regardless of the formation resistivity level, it is convenient to transform the response such that it bears information not only about the azimuthal direction of remote beds but also about the resistivity level. To do so, we create a pseudo resistivity image by combining the azimuthal resistivity measurement with the standard propagation resistivity measurement. FIG. 16a shows an example of a wellpath 601 which enters a formation 603 of resistivity 1 Ω-m from a lower formation 605 of resistivity 10 Ω-m. FIG. 16b shows the conventional propagation resisitivy response and FIG. 16c shows the pseudo-image obtained using the method of the present invention.

To generate a deep resistivity image, the azimuthal resistivity data are first pre-processed to correct a baseline shift. This is done using the method disclosed in U.S. patent application Ser. No. 11/299,053 of Chemali et al., having the same assignee as the present invention and the contents of which are incorporated herein by reference. A conventional multiple propagation resistivity (MPR) resistivity curve is selected which may be one of the MPR measurement curves or a weighted average of some or all of the MPR curves. In one embodiment of the invention, the 400 kHz attenuation-dreived resistivity curve is used. Both the azimuthal and conventional resistivity data are low-pass filtered to remove local variations. A trend analysis is applied to the conventional resistivity curve to determine whether or not the remote bed is more conductive than the bed in whixh the tool the tool is located. A trend analysis is applied to the azimuthal resistivity curves to determine the slope of the curves. At each depth level, the conventional resistivity curve is partitioned into 16 evenly spaced sectors by combining the azimuthal resistivity data into the conventional resistivity curve. The 16-sector resistivity curves vary around the input conventional resistivity curve. The amount of variation depends on the azimuthal resistivity signal strength at that depth level. The phase of the 16-sector resistivity curves is determined from the relative resistivity of the remote bed and the slopes of the azimuthal resistivity curves. The azimuthal resistivity signal strength is measured relative to a predefined value on either a linear scale or a logarithmic scale.

Those versed in the art and having the benefit of the present disclosure would recognize that the MPR measurements provide a background value with which the azimuthally sensitive measurements are combined to produce a resistivity image of the earth formation. This background value may also be derived from measurements such as xx-, yy- or zz-measurements that have a non-zero value even in a homogenous medium. The background values may also be derived using a coordinate transformation. Such measurements may be obtained using the 3DEX instrument described above or by using other instruments with tilted coils. See, for example, U.S. Pat. No. 6,181,138 to Hagiwara et al., U.S. Pat. No. 6,556,015 to Omeragic et al., and U.S. Pat. No. 6,969,994 to Minerbo et al.

Figure 17A:
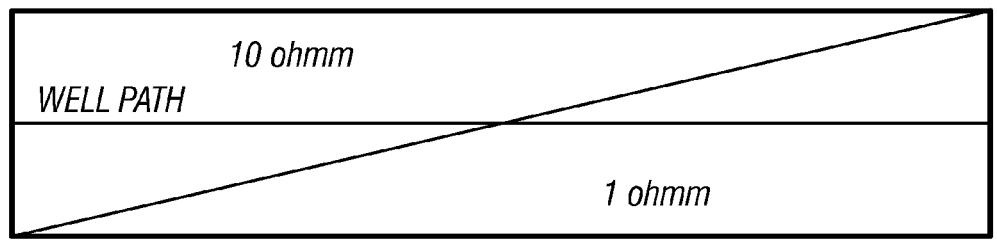
FIGS. 17a-17c are comparable to FIGS. 15a-15c for the case where the well enters the 1 Ω-m formation from above.
Figure 17B:
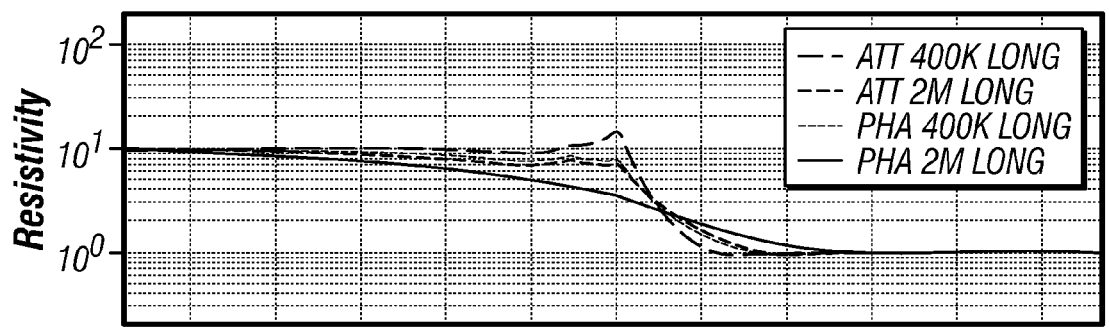
Figure 17C:
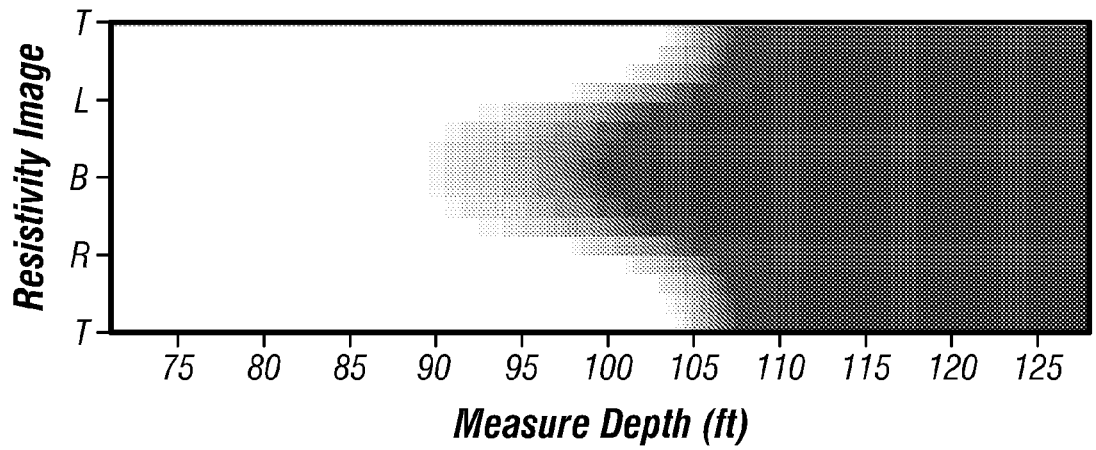

FIG. 17a shows a wellpath that wellpath enters the conductive formation from above. FIG. 17b shows the conventional propagation resistivity measurements and FIG. 17c shows the pseudo image. The pseudo resistivity image is interpreted in the same way for bed azimuths as for a borehole imaging log except that the former can not be interpreted directly for the bed dip angle through the traditional fitting of a sinusoidal pattern. Indeed the electrical diameter of the azimuthal propagation resistivity is much larger than that of electrical wellbore imaging tools.

The objectives of the new azimuthal resistivity measurement for reservoir navigation include (1) staying below a shale roof, (2) staying above an oil-water contact, (3) early identification of the azimuth and distance of approaching resistivity boundaries, and (4) avoidance of shale lenses and calcite stringers.

Production wells often need to be placed as high in a reservoir as possible for best recovery, but without entering the overlying shale. This is an important challenge because in many instances overlying shales are neither flat nor horizontal. The azimuthal signal alerts the reservoir navigation engineer of an approaching shale roof and shows its direction relative to the well path. The magnitude of the signal, together with the resistivity level, provides an indication of proximity to the roof. By comparing the measured signal magnitude to that of the pre-modeled signal, an estimate of the distance to the roof can be assessed.

It is sometimes desirable to maintain the well path at a controlled distance above an oil-water contact. This is particularly true for reservoirs where pressure is maintained by a gas cap. The azimuthal signal recognizes the oil-water contact as a resistivity interface approaching from below. The magnitude of the signal increases significantly as the well path approaches the free water surface (FIG. 17)

The present invention enables early identification of approaching boundaries. This is a general application of the azimuthal resistivity propagation measurement, particularly for geosteering in non layer-cake reservoirs. The new instrument is specifically designed to provide the direction of an approaching boundary as well as the distance to that boundary. An approaching boundary can be an oil-water interface, a shale stringer, the top of a reservoir or any formation with a resistivity contrast to the bed being drilled.

Traditional geosteering with propagation resistivity lacks azimuthal sensitivity. A conventional propagation resistivity tool helps detect an approaching bed and possibly estimate its distance, but such a tool does not distinguish "above" from "below" or "left" from "right". A conductive roof formation produces the same or similar signal as a shale stringer approaching from the side, or an oil-water contact approaching from below. The evasive action for one case is contrary to those of the other cases. Expert reservoir navigation engineers are trained to recognize such situations from non-azimuthal propagation, but they must have prior detailed knowledge of the subsurface; and they generally have difficulty handling non-layered cake situations such as in the examples below.

The present invention enables avoidance of shale lenses or calcite stringers. One of the challenges in drilling shaly sand reservoirs is to minimize non-productive intervals like shale lenses or calcite stringers. Calcite stringers present additional risks of damaging drill bits and the bottomhole assembly. Traditional non-azimuthal propagation resistivity tools will likely warn of an approaching high-resistivity bed with an elevated resistivity reading but will not tell anything about the direction of approach. The azimuthal resistivity measurement will be able to distinguish the approaching direction of a bed as it comes within the depth of investigation of the tool. The magnitude of the response and warning time increases with the relative approaching angles. If the well approaches a shale lens or calcite stringer along a sub-parallel well path, the new measurement is expected to provide enough advance warning for evasive action.

Figure 18:
FIG. 18 (prior art) shows an alternate hardware tool suitable for use with the method of the present invention.

An alternate embodiment of the invention uses data from a logging tool that has the receiver coil inclined in a non-transverse orientation to the tool axis and the axial transmitter coil. Such a tool is described in U.S. patent application Ser. No. 10/113,132 of Minerbo et al. and is illustrated in FIG. 18. U.S. Pat. No. 6,181,138 to Hagiwara et al discloses an arrangement in which up to three skewed transmitters and three skewed receivers may be used. With the arrangement in Hagiwara, it is possible to produce all nine of the principal components of the EM signal. For the purposes of this invention, it is sufficient to use a single receiver antenna. The average signal of the receiver antenna during continued rotation is similar to the response of the MPR and can be used to provide the background signal for the method described above. Subtracting the average signal from the receiver signal gives an azimuthal response similar to that provided by the configuration of FIG. 5a, 5b. A dual transmitter-dual receiver arrangement may also be used with the configuration of FIG. 18.

The ability to produce a pseudo-image from MPR and azimuthally sensitive, deep-reading resistivity measurements is an important advance over the teachings of Wu, as well as other navigation techniques that rely on images produced by nuclear or borehole imaging methods. Using the methodology described above, it is possible to perform reservoir navigation using resistivity measurements better than with the prior art methods.

U.S. Pat. No. 6,957,708 to Chemali et al., having the same assignee as the present invention and the contents of which are incorporated herein by reference, teaches an MWD resistivity imaging device in which the transmitter and receiver antenna coils are mounted on a stabilizer. This arrangement results in a shallow image of the earth formation that may not see much beyond the borehole wall. In contrast, in the present invention, at least one of the transmitter coil and the receiver coil are wound around the longitudinal axis of the tool. With this configuration, the azimuthally sensitive resistivity measurements have a greater depth of penetration than the invention of Chemali.

The processing of the data may be done by a downhole processor to give corrected measurements substantially in real time. Alternatively, the measurements could be recorded downhole, retrieved when the drillstring is tripped, and processed using a surface processor. Implicit in the control and processing of the data is the use of a computer program on a suitable machine readable medium that enables the processor to perform the control and processing. The machine readable medium may include ROMs, EPROMs, EEPROMs, Flash Memories and Optical disks. The term "processor" as used herein is intended to include such devices as Field Programmable Gate Arrays (FPGAs).

The foregoing description is directed to particular embodiments of the present invention for the purpose of illustration and explanation it will be apparent, however, to one skilled in the art that many modifications and changes to the embodiments set forth above are possible without departing from the scope and the spirit of the invention. It is intended that the following claims be interpreted to embrace all such modifications and changes.

What is claimed is:

1. A method of developing a reservoir in an earth formation, the method comprising:
   (a) conveying a bottomhole assembly (BHA) into a borehole in the earth formation;
   (b) obtaining azimuthally sensitive propagation resistivity measurements;
   (c) identifying a feature selected from (A) an electrical midpoint, and (B) an electrical saddle-point in the azimuthally sensitive propagation resistivity measurements; and
   (d) identifying a geometric relation of a position of the BHA relative to a bed boundary in the earth formation using the identified feature.

2. The method of claim 1 further comprising controlling a drilling direction of the BHA using the identified geometric relation.

3. The method of claim 2 wherein controlling a drilling direction of the BHA further comprises at least one of (i) staying below a shale roof, (ii) staying above an oil-water contact, (iii) identifying an azimuth and a distance of a resistivity boundary in the earth formation, (iv) avoiding a shale lens, and (v) avoiding a calcite stringer.

4. The method of claim 1 wherein obtaining the azimuthally sensitive measurements further comprises correcting for an eccentering of the logging tool in the borehole.

5. The method of claim 1 wherein obtaining the azimuthally sensitive measurements further comprises correcting for a bending of the logging tool in the borehole.

6. An apparatus for developing a reservoir in an earth formation, the apparatus comprising:
   (a) a bottomhole assembly (BHA) conveyed into a borehole in the earth formation;
   (b) a logging tool on the BHA which obtains azimuthally sensitive propagation resistivity measurements;
   (c) a processor configured to:
      (I) identifies a feature selected from (A) an electrical midpoint, and(B) an electrical saddle-point in the azimuthally sensitive propagation resistivity measurements; and
      (II) identifies a geometric relation of a position of the BHA relative to a bed boundary in the earth formation.

7. The apparatus of claim 6 wherein the processor is further configured to control a drilling direction of the BHA using the identified geometric relation.

8. The apparatus of claim 7 wherein processor is configured to control the drilling direction of the BHA by at least one of (i) staying below a shale roof, (ii) staying above an oil-water contact, (iii) identifying an azimuth and a distance of a resistivity boundary in the earth formation, (iv) avoiding a shale lens, and (v) avoiding a calcite stringer.

9. The apparatus of claim 6 further comprising a drilling tubular which conveys the BHA into the borehole.

10. A computer-readable medium for use with an apparatus for developing a reservoir in an earth formation, the apparatus comprising:
   (a) a bottomhole assembly (BHA) configured to be conveyed into a borehole in the earth formation; and (b) a logging tool on the BHA configured to obtain azimuthally sensitive propagation resistivity measurements;

the medium comprising instructions that enable at least one processor to:

(c) identify a feature selected from (A) an electrical midpoint, and (B) an electrical saddle-point in the azimuthally sensitive propagation resistivity measurements; and (d) identify a geometric relation of a position of the BHA relative to a bed boundary in the earth formation.

11. The medium of claim 10 further comprising at least one of:

(i) a ROM, (ii) an EPROM, (iii) an EEPROM, (iv) a flash memory, and (v) an optical disk.

* * * * *

UNITED STATES PATENT AND TRADEMARK OFFICE
CERTIFICATE OF CORRECTION

PATENT NO.        : 7,483,793 B2                              Page 1 of 1
APPLICATION NO.   : 11/489875
DATED             : January 27, 2009
INVENTOR(S)       : Tsili Wang and Roland E. Chemali It is certified that error appears in the above-identified patent and that said Letters Patent is hereby corrected as shown below:

Column 14, claim 6, lines 44 and 48, delete "identifies" and insert --identify--.

Signed and Sealed this

Tenth Day of March, 2009

JOHN DOLL
*Acting Director of the United States Patent and Trademark Office*